June 27, 1972　　P. F. GROSSO ET AL　　3,672,931

METHOD OF FORMING PHOSPHOR SCREEN

Filed July 27, 1970

INVENTORS.
PATRICK F. GROSSO
RAYMOND F. HECK

BY

ATTORNEY

United States Patent Office 3,672,931
Patented June 27, 1972

3,672,931
METHOD OF FORMING PHOSPHOR SCREEN
Patrick F. Grosso, Stamford, and Raymond F. Heck, Norwalk, Conn., assignors to Columbia Broadcasting System, Inc.
Filed July 27, 1970, Ser. No. 58,290
Int. Cl. H01j 29/26
U.S. Cl. 117—33.5 CP
9 Claims

ABSTRACT OF THE DISCLOSURE

A high quality, uniform textured luminescent screen suitable for use in a high resolution cathode ray tube or the like is produced by successively depositing by settling two or more separate layers of phosphor.

BACKGROUND OF THE INVENTION

This invention relates to luminescent screens suitable for use in cathode ray tubes or the like, and more particularly to a process for forming a luminescent screen having improved grain structure and increased luminescent flux.

Luminescent screens are commonly made by settling the pulverized constituents of a luminescent material, generally held in a water suspension, onto a suitable backing such as the inner wall of the faceplate of a cathode ray tube. Extensive examination and testing of settled screens has indicated that they consist of fine grain phosphor particles which have agglomerated during settling. This agglomeration of particles and the accompanying voids or thin areas therebetween, is caused by the attraction of oppositely charged particles, repulsion of similarly charged particles, and electrostatic attraction or repulsion between the phosphor and the faceplate of the tube, and is the principal determinant of the texture of the screen. When the screen is scanned with an electron beam, the voids or thin areas yield less light output than the cluster or agglomerate areas with the consequence that the variations in thickness (or texture) shows up as a low frequency fluctuation in the light output of the screen. In some applications this is not objectionable, but in other cases, such as in flying spot scanner systems in which variations in the density of a scanned film are detected by a photomultiplier tube, the low frequency fluctuation can and does have a deleterious effect on the operation of the system. Low frequency fluctuation in light output is also objectionable in CRT recorder systems where sharpness of the edges of characters and lines is extremely important. It is desirable, therefore, that the deposited screen have a fine texture of uniform thickness, absent of voids and thin areas. This result is achieved in accordance with the invention by successively depositing, by a settling process, two or more separate layers of phosphor.

It is known, of course, to produce cathode ray tubes having multi-layer phosphor deposits thereon. Pritchard Pat. No. 3,231,775, for example, discloses a luminescent screen having superimposed phosphor layers of different physical texture, the first comprising coarse, sedimentary-sized particles of one color light-emitting phosphor laid down by settling and another relatively thinner layer of a different light-emitting phosphor evaporated thereon. The purpose of the multiple layers is to reproduce images in color, and the combination of one or more evaporated layers on the coarse particle settled layer, affords the advantage of low voltage color switching. The coarse particle layer is deposited first, thus improving forward light transmission to the viewer.

Sadowsky Pat. No. 2,412,654 also shows a multi-layer luminiscent screen having a first settled screen of graduated particle size phosphor on the substrate, a binder layer on the smaller particles of the first layer, and a second layer of graduated particle size phosphor, the larger particles of which are in contact with the binder layer. A definite barrier layer is provided between the two phosphor layers.

Pat. No. 2,423,626 to Szegho discloses another method of manufacturing multi-layer screens for cathode ray tubes which includes the steps of applying a binder to the glass faceplate of the tube, dusting a first layer of phosphor onto the binder, drying and baking the dusted layer, settling a second layer of phosphor over the first layer from a water glass solution, decanting the excess liquid and drying and baking the composite screen.

U.S. Pat. No. 2,475,330 to Levy discloses a composite luminescent screen having several layers of predetermined thickness for the purpose of controlling the luminescent properties of the screen. In a specific example, a screen settled from a water mixture containing separately prepared phosphor constituents is composed of: first, layer of zinc sulfide; second, a layer of zinc beryllium silicate, and, finally, a top or outer layer of beryllium oxide. The order or sequence of deposition of the constituents is determined by the particle size of the constituents.

It will be observed that the composite screens of these prior art patents are for a variety of purposes, none of which, however, is to achieve a more uniform texture having the attendant advantages of reduced light level fluctuations and increased luminescent flux.

SUMMARY OF THE INVENTION

It is an object of the present invention to provide a phosphor screen, suitable for use in high resolution cathode ray tubes or the like, having a highly uniform texture and capable of producing increased luminescent flux and reduced light level fluctuations.

Briefly, in accordance with the invention, the screen is produced by successively depositing by settling at least two separate layers of the same phosphor, and with essentially the same particle size distribution, with a drying step in between. The settling time for each layer (for a two-layer screen, for example) is approximately one-half that required to deposit a single layer screen of comparable total thickness. While the reduced settling times for the individual layers significantly reduces the formation of agglomerates, the first layer nonetheless exhibits thin areas between heavier built up areas. During deposition of the second layer, the settling phosphor particles tend to deposit faster on the thin areas of the first layer than on the agglomerates, thereby giving the finished screen a more uniform texture. Important features of the process are the controlled selection of phosphor particle size range by elutriation and reduced settling times for the individual layers to minimize the formation of particle agglomerations.

DESCRIPTION OF THE DRAWING

A better understanding of the invention will be had from the following detailed description, taken in conjunction with the accompanying drawing, in which.

DESCRIPTION OF THE PREFERRED EMBODIMENTS

Figure 1:
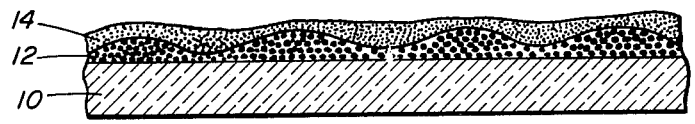
FIG. 1 is a cross-sectional view, greatly enlarged, of a phosphor screen useful in explaining the invention.

As was noted earlier, a principal determinant of the texture of a settled phosphor screen is the extent to which the phosphor particles agglomerate, either before being placed in suspension or during the settling process. As illustrated in FIG. 1, the agglomeration of particles (that is, several adhering to each other) causes the settling particles to be more densely deposited at points on the substrate at which an agglomerate of particles settled initially. Accordingly, the first layer 12 on the substrate 10, which may be glass or metal faceplate for a cathode ray tube, tends toward a hill and valley effect, having greatest thickness at areas of initial particle agglomeration and between which are voids or areas of less thickness. This result, which affects the overall texture of the screen, is caused by the attraction of oppositely charged phosphor particles, repulsion of similarly charged particles, and electrostatic attraction or repulsion between the settling phosphor particles and the substrate 10. It will be evident that as an electron beam scans a phosphor layer having the texture of layer 12 alone (which is illustrative of "conventional" settled screens), the light output will fluctuate with the variations in thickness—an undesirable result in many applications of cathode ray tubes.

This defect of the usual settled single-layer phosphor screen is corrected, in accordance with the invention, by depositing onto the first layer 12, after a suitable brief drying period, a second layer 14 of phosphor particles having the same range of sizes as used to deposit layer 12. The total of the settling times of the two layers is essentially the same as the settling time of a single layer screen of the same total thickness as the multi-layer screen; that is, the present method does not increase the overall processing time. An important benefit of the shorter settling times for the individual layers is a reduction in the formation of agglomerates, which, in turn, contributes to a finer texture. During deposition of the second layer, the phosphor particles tend to deposit faster in the valleys of the first layer than on the thicker agglomerates, so as to essentially fill in the "low spots" without appreciably increasing the thickness of the high spots, to give a finished screen of more uniform texture and thickness than a single-layer screen. It is believed that the selective attraction of the phosphor particles to the thinner areas of the first layer is caused by the attraction of unlike potential charges between the thinner areas and the new particles settling out of suspension.

The method of the invention is equally applicable to any of the variety of phosphors used in the fabrication of cathode ray tubes, and the following discussion is relevant regardless of the phosphor used. Phosphor powder as received from vendors has a range of particle size from about 0.5 to 30 microns, and some of the particles are agglomerated; i.e., stuck to each other. According to the present method, a two or three-step elutriation schedule is employed to remove the heavier particles (above about 10 microns) and agglomerates and to select a range of phosphor particle sizes. The elutriation suspension contains an electrolyte, such as sodium bicarbonate, which is absorbed on and charges the phosphor particles to keep them in suspension by virtue of the zeta potential developed between particle and liquid. A bonding agent conventionally used in the settling of phosphor screens, namely, potassium silicate, is added to the suspension liquid during the final elutriation step, and forms a gel-like structure with the charged phosphor particle. The silicate strengthens the bonding of the phosphor to the substrate and the presence of the electrolyte accelerates polymerization of the silicate structure and also lowers the electrostatic repulsion of the substrate surface. Besides influencing adhesion of the phosphor to the substrate, the electrolyte and silicate density also influences the phosphor dispersion and grain characteristics of the resulting phosphor screen.

As will be seen from the following examples, the elutriation schedule is the same for both layers with the result that the particle size distribution is essentially the same in both layers, or stated another way, is uniform throughout the thickness of the multilayer screen. That is, there is no attempt to graduate the size of the particles within either of the layers, or from layer to layer, as suggested, for example, in above-mentioned Pat. No. 2,475,330.

Following are several non-limiting examples of utilizing the process of multi-layer deposition for a variety of different phosphors.

EXAMPLE I—P16

In applying the process to the formation of P16 phosphor (calcium magnesium silicate: cerium activated) screens, phosphor powder as received from the vendor and having a particle size range of from about 0.5 to 30 microns is elutriated to get rid of agglomerates and the larger particle sizes to insure a screen of uniform and smooth texture. The elutriation is carried out in three steps in a solution of distilled water and an electrolyte, which may be sodium bicarbonate. Typically, to each 1000 cc. of distilled water is added 14 grams of sodium bicarbonate and 6 grams of P16 phosphor. Preferably, the solution is chilled to a temperature of approximately 10° C. at the start of the elutriation to reduce agglomeration growth, and also to set up convection currents in the liquid to foster uniformity of settling out of the larger particles. After initial mixing, the elutriation proceeds for 10 minutes after which approximately 80% of the center portion of the liquid is drained off and elutriated for another 10 minutes, after which about 80% of the center portion is again drained off. Thereafter, 36 cc. of potassium silicate (30% solids) is added to the remaining solution and the solution subjected to ultrasonic agitation for 3 minutes. This agitation insures that heavy phosphor particles, and particles which have not been coated with potassium silicate, will settle out and adhere to the bottom of the vessel when the useable settling suspension is decanted. Following these three elutriation steps, the remaining phosphor suspension which contains particles in the range of 0.5 to 10 microns, most of which have a diameter of 2.0 microns or less, is poured through a fine mesh filter into the tube envelope to a suitable height. The height of the "cushion" is variable with the size and contour of the tube, but for a 3" diameter tube a liquid height of the order of ¾" has been found satisfactory. After settling for 20 minutes, the liquid is decanted from the tube, using a conventional tilt table, and the resulting screen dried in its upside down position with dry nitrogen, or with filtered air, at room temperature. Drying times of 3 or 4 minutes, which is not critical, are typical.

A second layer is deposited onto the first by repeating the above steps, namely, the three elutriation steps with the potassium silicate added for the third elutriation, and settling for 10 to 20 minutes, depending on the desired screen weight. By way of example, for a screen thickness requiring 45 minutes for settling a single layer, the settling time for each of the two layers of the composite screen is approximately 20 minutes.

The tube is then decanted and the second layer dried in the usual way. Thereafter, the screen may be lacquered and aluminized, if desired, utilizing well known techniques.

EXAMPLE II—P20

To 1000 cc. distilled water are added 12 grams of sodium bicarbonate and 1.5 grams of P20 (zinc cadmium sulfide: silver activated) phosphor. After initial mixing, the elutriation proceeds for five minutes, the liquid is drained off, and 36 cc. potassium silicate (30% solids) is added. Elutriation is continued for an additional 15 minutes, and thereafter the remaining phosphor suspension is poured through a fine mesh filter into the envelope of the tube and settled for 20 minutes. After decanting, the resulting screen is dried with dry nitrogen, or with filtered air, at room temperature, for 3 minutes. A second layer is deposited onto the first by repeating the above steps, namely, the two elutriation steps with potassium silicate added for the second elutriation, and settling for 10 to 20 minutes, depending on the desired screen weight.

EXAMPLE III—P11

To 1000 cc. distilled water add 14 grams of sodium bicarbonate and 15 grams of P11 phosphor powder. After initial mixing, elutriate for 15 minutes and drain off the remaining phosphor suspension. Thereafter, add to the remaining liquid 36 cc. potassium silicate (30% solids) and subject to ultrasonic agitation for 5 minutes and then continue to elutriate for an additional 1.5 minutes. The resulting phosphor suspension is poured into the tube envelope and allowed to settle for 20 minutes, after which the liquid is decanted from the tube and the screen dried with dry nitrogen or filtered air at room temperature for 3 or 4 minutes. A second layer is deposited by repeating the above elutriation steps and settling for 10 to 20 minutes, depending on the desired screen weight.

EXAMPLE IV—P24

To each 1000 cc. distilled water add 14 grams sodium bicarbonate and 7.0 grams P24 phosphor. After initial mixing, elutriate 1.25 minutes and to the remaining phosphor suspension add 36 cc. potassium silicate (30% solids) and elutriate for 5 minutes. Thereafter the liquid is poured off and elutriated for an additional 6.5 minutes. Following these three elutriation steps, the phosphor suspension is poured through a fine mesh filter into the tube envelope and settled for 25 minutes. After decanting and drying of the first screen, the above elutriation process is repeated and the resulting suspension introduced into the tube envelope and allowed to settle for 10 to 20 minutes, depending on the desired screen weight. After decanting, the screen is dried at room temperature with dry nitrogen or filtered air.

Figure 2:
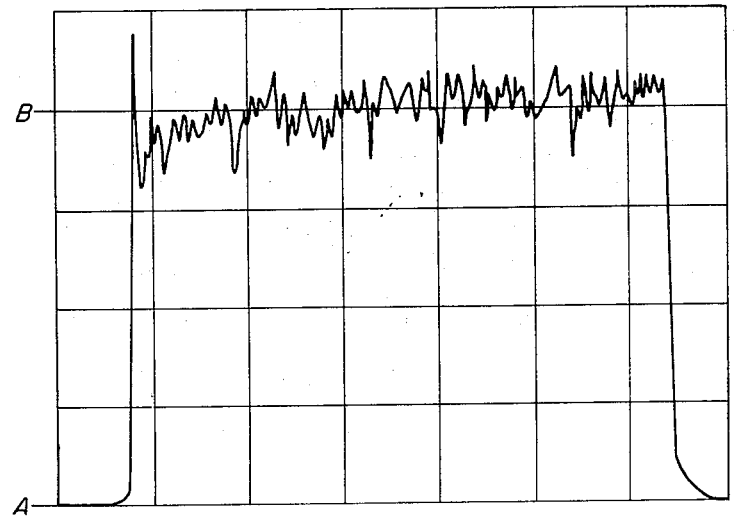
FIG. 2 is a reproduction of the results of a single line noise measurement of a conventional single-layer, high resolution settled phosphor screen.
Figure 3:
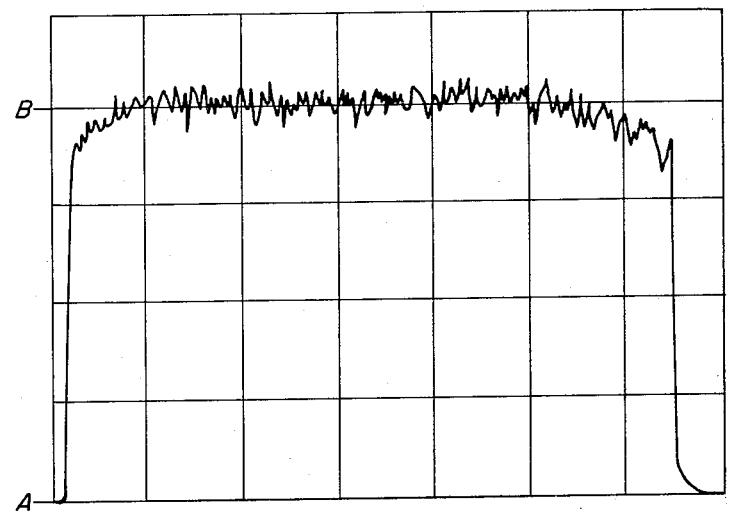
FIG. 3 is a reproduction of the results of a single line noise measurement of a two-layer phosphor screen deposited in accordance with the invention.

The difference between the texture of a single layer and a two-layer phosphor screen deposited in accordance with the invention is graphically demonstrated by noise measurements conducted on the two screens, the results of which are depicted in FIG. 2 and in FIG. 3, respectively. The test is made by selecting for measurement one line of a focussed raster having a line spacing to allow selection of a single line. The single line is imaged onto a photomultiplier which has a spectral response broad enough to accept the spectral emission of the phosphor. The signal from the photomultiplier is applied to an oscilloscope, and the circuitry adjusted so that four vertical graduations (in the illustrated example) represent the range in light output from the dark current of the photomultiplier at level A to full white at level B. The grain noise of the screen appears as spikes on the current waveform some of which for the single layer screens depicted in FIG. 2 amount to 10% and more of the light level range of the screen. For the two-layer screens depicted in FIG. 3, however, the spikes are much shorter—of the order of 3 to 5% of the light level range of the screen—and closer together, indicating a smoother and more uniform texture.

Besides reducing low frequency light level fluctuations, the smoother texture also increases the radiant output of the screen for a given energy level of excitation, and improves the uniformity of the light output of the overall screen. Also, because of the smoother surface, the reflective metal backing usually applied to the screen (e.g., by aluminizing) is also smoother and of more uniform thickness than when applied to single layer screens of the prior art. The reflective and conductivity properties of the reflective backing, in turn, have an effect on the aging of the screen. It has been observed, for example, that an aluminized two-layer screen aged only about 80% as fast as the best high resolution single settled layer screens tested, which may result from the fact that the beam current required for a given radiant output is one-third as large for the double-layer screen as for a single-layer screen. Thus, not only is the performance of the tube substantially improved, but its useful life extended as well.

We claim:
1. The method of making a luminescent screen on the faceplate of a cathode ray tube comprising the steps of covering the horizontally disposed faceplate to a predetermined depth with a settling solution containing water, an electrolyte and potassium silicate in which phosphor particles of a selected range of sizes are suspended, allowing said phosphor particles to settle on said faceplate for a first predetermined period, removing the settling solution, drying the thus-deposited phosphor layer, covering the horizontally disposed faceplate to said predetermined depth at least a second time with a settling solution having substantially the same constituents and properties as the settling solution utilized to deposit the first layer, allowing the phosphor particles in said second-applied suspension to settle upon said first layer for a second predetermined period, removing the settling solution, and drying said resulting multi-layer screen.

2. The method of claim 1 wherein said first and second predetermined periods are of approximately equal duration and their sum approximates the time required to settle a single-layer screen of the same thickness as said multi-layer screen.

3. The method of claim 1 wherein said successively applied layers of phosphor are dried at room temperature.

4. The method of claim 1 where said electrolyte is sodium bicarbonate.

5. The method of making a luminescent screen on the faceplate of a cathode ray tube comprising the steps of forming a settling solution by elutriation of a mixture of distilled water, sodium bicarbonate and phosphor particles having a range of sizes including unwanted sizes, adding potassium silicate to the elutriant before the final elutriation step, covering the horizontally disposed faceplate to a predetermined depth with said settling solution, allowing phosphor particles in said settling solution to settle on said faceplate for a first predetermined period, removing the settling solution, drying the thus-deposited phosphor layer, covering said faceplate to said predetermined depth at least a second time with a settling solution having the same constituents and properties as the settling solution utilized to deposit the first layer, allowing the phosphor particles in said second-applied suspension to settle upon said first layer for a second predetermined period, removing the settling solution and drying said resulting multi-layer screen.

6. The method of claim 5 wherein said mixture of water, sodium bicarbonate and phosphor particles is chilled to approximately 10° C. preparatory to the first elutriation step.

7. The method of claim 5 wherein said successively applied layers of phosphor are dried at room temperature.

8. The method of claim 5 wherein said phosphor is calcium magnesium silicate: cerium activated, and wherein during the final elutriation step said mixture is subjected to ultrasonic agitation.

9. The method of claim 8 wherein the phosphor particles in said settling solution range in size from 0.5 to 10 microns, said first predetermined period is approximately 20 minutes, and said second predetermined period is in the range from 10 to 20 minutes, depending upon the desired weight of the multi-layer screen.

References Cited
UNITED STATES PATENTS

| | | | |
|---|---|---|---|
| 3,275,466 | 9/1966 | Kell | 117—33.5 CS |
| 2,328,292 | 8/1943 | Painter | 117—33.5 CS |
| 2,412,654 | 12/1946 | Sadowsky | 117—33.5 CS X |
| 2,828,216 | 3/1958 | Delrieu | 117—33.5 CS X |
| 3,231,775 | 1/1966 | Pritchard | 117—33.5 CP X |

RALPH S. KENDALL, Primary Examiner

U.S. Cl. X.R.

117—33.5 CS